United States Patent Office 3,406,863
Patented Oct. 22, 1968

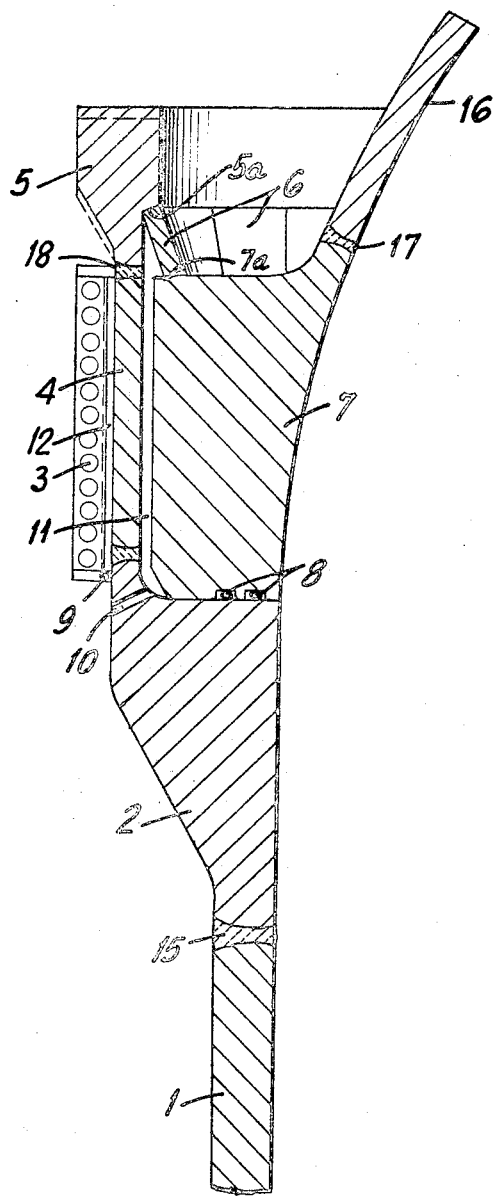

3,406,863
PRESSURE VESSEL CLOSURE AND
METHOD OF FORMING
Werner Wenzel, Hattingen (Ruhr), and Walter Wenzel,
Heiligenhaus, Rhineland, Germany; said Werner Wenzel assignor to Rheinstahl Huttenwerke AG., Essen,
Germany, and said Walter Wenzel
Filed Aug. 1, 1966, Ser. No. 569,200
Claims priority, application Germany, Aug. 2, 1965,
R 41,223
10 Claims. (Cl. 220—46)

This invention relates, in general, to a pressure vessel construction and to a method of sealing pressure vessels and, in particular, to a new useful pressure vessel particularly for use in the chemical and atomic energy industries which includes a cover having a flange abutting a flange of the vessel in sealing engagement therewith and with the vessel flange having an extending portion terminating in a ring flange which is tensioned against spacers applied around the flange of the cover by heating and thereafter cooling the extending portion.

Covers for pressure vessels are usually applied by fastening them with securing elements such as screws or bolts. In order to obtain as uniform a flange load as possible between the cover and the vessel, it is desirable in screw closure vessels of large diameter to distribute the total load, which acts on the flange connection and which is a function of the pressure in such a manner that the largest possible number of screws is obtained while maintaining the smaller screw spacing or division. Under such conditions, the smallest flange dimensions are obtained. The problem of employing such screw connections, however, is that all the screws should be loaded or stressed uniformly and, if possible, at the same time. It is known to uniformly and simultaneously tension expansion screws by means of hydraulic tensioning devices which exert a uniform pressure on the flange so that all nuts may be uniformly screwed down to cause them to absorb the same load after the pressure is released from the tensioning device. Such tensioning devices have been found to give good results from a practical point of view. A certain disadvantage, however, resides in the relatively high investment and expenditure for the apparatus.

In another embodiment of a cover closure for pressure vessels, the securing screws are expansion screws which are heated by means of electrical heating rods which are arranged in the center bore of the screws to cause the screws to expand in a longitudinal direction. Thereafter, the nuts are simultaneously tightened or screwed down in a groupwise arrangement. However, it has been found that, in this manner, it is not possible to obtain a sufficiently uniform screw load.

In accordance with the invention, there is provided a new cover securing method and apparatus for uniformly tightening the cover on a pressure vessel. In the preferred arrangement, the vessel includes a flange portion arranged to mate in sealing engagement with a flange portion of a cover. The flange portion of the vessel advantageously includes an outwardly extending encircling portion or shot member to which is secured a flange ring which extends beyond the flange of the cover. In accordance with the method of the invention, the extending portion of the flange which encircles the flange of the cover is heated so that it expands in a longitudinal direction to increase the spacing between the flange ring and the outer end of the flange of the cover member. In the expanded condition, spacers of selected size are inserted between the flange of the cover and the flange of the ring uniformly and simultaneously around the complete periphery. The spacers are arranged in such a manner that during the cooling of the surrounding shot member, the cover with its flange is uniformly tensioned on the flange of the vessel.

The cover closure construction of the invention can be embodied in different manners. By choosing the vertical position and the angle of the spacer members relative to the centers of gravity of the upper flange ring and the cover flange, smaller dimensions can be obtained for these members than was required for prior art flanges subject to comparable load. Since no screws are required, the flange dimensions can be smaller because the cross sectional area is not weakened by the screw holes or bores.

The apparatus for carrying out the method of the invention advantageously includes an encircling heating coil system which comprises two electrically separated induction windings having individual heating effects for heating the portion of the flange which extends upwardly around the cover flange. The encircling heating coil system is advantageously such that it is spaced from the encircling band or shot member so that the shot member may be rapidly cooled after heating. In addition, the vessel is constructed such that the flange is provided with a bore therethrough in order to permit conduction of a cooling fluid through the bore into an annular space between the encircling band and the flange of the cover member.

Accordingly, it is an object of the invention to provide a pressure vessel having a flange which provides a pressure sealing seat for a flange of a cover member and which also includes an encircling band connected to the exterior periphery of the vessel flange and which extends around the flange of the cover and terminates at its upper end in a flange ring which extends beyond the cover, and with spacers positioned between the flange ring and the flange of the cover which are held in position by the heat shrinking of the encircling band with the ring flange over the spacer members.

A further object of the invention is to provide a method of forming the closure of a vessel having a flange which is engageable in pressure sealing engagement with a flange of a cover which comprises heating an encircling band which is connected to the flange of the vessel and extends in spaced relationship around the flange of the cover to cause it to elongate and to move a connecting flange ring away from the adjacent end of the flange of the cover, thereupon inserting spacers between the flange ring and the flange of the cover while the encircling band is maintained in a heated condition, and permitting the encircling band to cool in order to cause the flange ring to move downwardly to tightly engage the spacers and to urge them into sealing engagement around the flange of the cover.

A further object of the invention is to provide a pressure vessel construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing in which there is illustrated a preferred embodiment of the invention.

The only figure of the drawing is a partial longitudinal sectional view of a pressure vessel constructed in accordance with the invention.

Referring to the drawing, in particular, the invention comprises a closure construction and method of forming the closure for a pressure vessel 1. The pressure vessel 1 is provided with the usual upper flange portion 2 which may be integrally formed with the vessel or formed as an extension which is welded thereto such as by an annular weld 15.

In accordance with the invention, a cover member 16 having a flange 7 formed around its lower periphery or connected thereto such as by welding 13, is engaged over the flange 2 of the vessel. Suitable sealing members such as O-rings 8 are contained in annular grooves which extend around on the bottom end of the flange 7.

The flange 2, in accordance with the invention, is provided with an annular band or shot member 4 which is connected to the outer upper periphery of the flange 2 such as by welding around an annular area at 11. The shot member 4 also is rigidly connected with a flange ring 5 such as by welding 13. The flange ring 5 is provided with a holding area or stop surface 5a providing a seat for one end of a plurality of spacer members or plates 6. The other ends of the spacer members bear against a seat formation 7a formed around the periphery of the flange of the cover 16. The spacer members 6 are pressed between the seat 5a and the seat 7a by heat stressing so that the flange ring 5 bears uniformly downwardly around its periphery on all of the spacers to tightly seal the periphery of the flange 7 in position over the flange 2 of the vessel.

In accordance with the method of the invention, the shot member 4 is heated before the spacers 6 are inserted between the flange ring 5 and the cover flange 7. The heating system 3 consists of two electrically separated induction windings or coils. The heating effect of each induction winding is such that a sufficient thermal axial expansion of the shot member 4 results. While the shot member 4 is maintained in a heated condition, the spacers 6 are inserted between the seats 5a and 7a. They are sized such that there will be uniform pressure engagement on all of the spacers around the periphery of the flange 7 when the heating is stopped and the shot member 4 is permitted to return to its normal position to compress the spacers downwardly against the flange 7 and to cause the flange 7 to tightly seal with the flange 2 of the vessel. The final dimension of the shot member 4 may be easily controlled by the heating elements 3 so that the spacers may be pushed in between the cover flange 7 and the flange ring 5 without difficulty. In some instances it is preferable to accelerate the cooling procedure which may be done by blowing air into the annular gaps 11 and 12 through a bore 10 defined in the flange ring 2 and an opening 9 located at the lower end of the annular gap 12, respectively.

Generally, the spacer pieces 6 will be dimensioned to correspond to the operating pressure of the vessel. Of course, pressure testing of the container or vessel can be performed with a multiple of the pressure ordinarily prevailing during operation if the shot member 4 is heated by a somewhat greater amount than usual and additional heat members are pushed under the spacer members 6. In such a manner, the securing of the flanges 2 and 7 for the pressure test may be easily obtained.

The cover closure of the invention has many advantages as compared to the known constructions. The time required for inserting the spacer members is smaller than the time required for the tensioning of screws. With the same resistance moment, the flange dimensions may be much smaller because the cross sections need not be weakened by providing a plurality of screw bores. Because there is a continuous force distribution around the flange which would not be so if there were a plurality of spaced bores provided, the cover flange is completely uniformly stressed.

Only the loose spacer members 6 are movable individual parts. No parts which can wear down are present. The carrying out of the method may be done in a simple manner merely by applying heat around the extending shot member 4 which encircles the flange 7 of the cover. This is in contrast to the complicated apparatus which is required for pretensioning the screws.

While a specific embodiment of the invention has been shown and described in detail to illustrate the application of the inventive principles, it will be understood that the invention may be embodied otherwise without departing from such principles.

What is claimed is:

1. A pressure vessel closure comprising a vessel having an opening with a surrounding annular flange, a cover having a flange engaged over the flange of said vessel, a shot member connected to the periphery of said vessel flange extending outwardly therefrom around said cover flange and terminating at its outer end in a ring flange, and a plurality of spacers disposed between the interior of said ring flange and said cover flange, said ring flange bearing against said spacers in tight pressure sealing engagement and holding said cover flange in uniformly tight pressure sealing engagement with said vessel flange.

2. A pressure vessel closure according to claim 1, wherein said shot member is spaced outwardly from the flange of said cover to provide an annular cooling space therebetween, and an opening defined in said vessel flange to permit the passage of cooling fluid to the annular space between said shot member and said cover flange.

3. A pressure vessel closure, according to claim 1, including an induction heater surrounding said shot member and spaced therefrom for heating said shot member to cause axial expansion of the shot member to permit insertion of the spacers between said ring member and the flange of said cover.

4. A pressure vessel closure, according to claim 1, including a plurality of O-rings disposed between said cover flange and said vessel flange, said shot member being connected to said vessel flange by a weld.

5. A pressure vessel closure, according to claim 4, wherein said ring member is connected to said shot member by a weld.

6. A method of closing a pressure vessel having an annular flange which is engaged by an annular flange of a cover member and which also includes an encircling band portion which extends outwardly from the vessel flange and around the flange of the cover and terminates at its outer end in a ring, and using a plurality of spacer members, comprising heating the encircling band to cause it to expand in a longitudinal direction and to move the ring away from the flange of the cover, inserting a plurality of spacers between the encircling ring and the flange of the cover in uniform contact around the periphery of the flange of the cover, and permitting the encircling band member to cool to permit the ring to move closer to the cover flange and to compress the spacer members therebetween to tightly seal the flange of the cover against the flange of the vessel.

7. A method according to claim 6, including heating the intermediate member by an induction coil having separate heating coils arranged around the intermediate member.

8. A member according to claim 6, wherein the intermediate member is welded to the upper end of the flange of the vessel.

9. A method according to claim 6, wherein the encircling ring is welded to the upper end of the encircling band.

10. A method according to claim 6, wherein the spacer members are chosen in such a manner that the spacing between the ring flange and the cover will have as little tendency as possible to cause the twisting or turning of the flange when it is cooled.

References Cited

UNITED STATES PATENTS 2,334,762   2/1956   Aleck _____ 220—46

THERON E. CONDON, *Primary Examiner.*

J. B. MARBERT, *Assistant Examiner.*